O. G. & S. G. Fessenden,
Card Holder.
No. 77,266.        Patented Apr. 28, 1868.
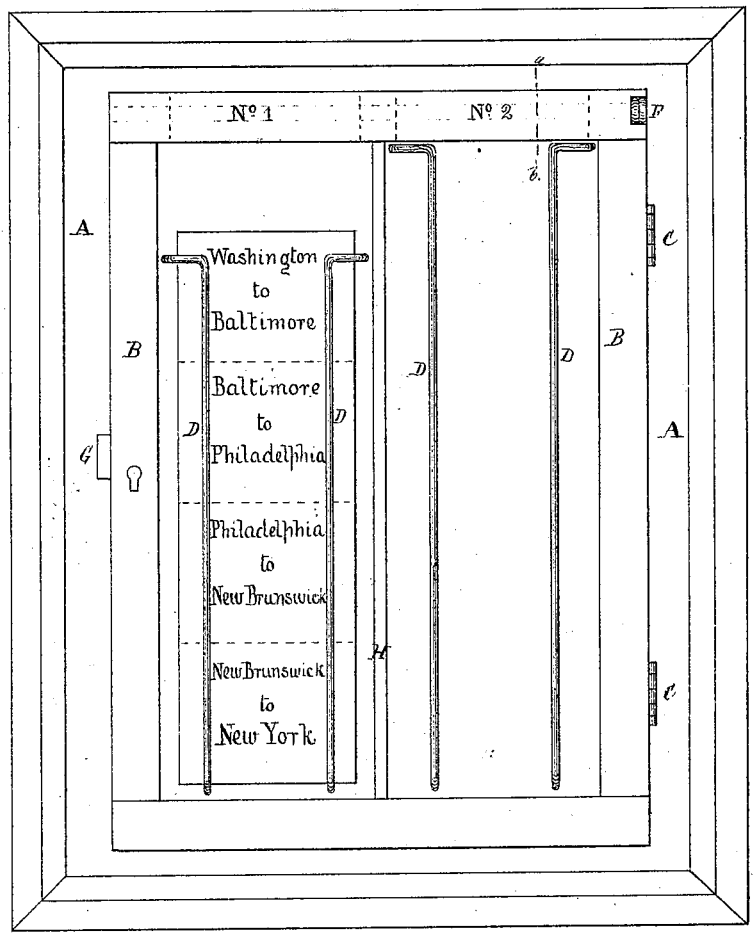
Fig. 1.
Fig. 2.   Fig. 3.
 
Witnesses.
Jos. L. Coombs
Fred W. Dow
Inventor.
Oliver G. Fessenden
Seth G. Fessenden
by J. Coombs
atty

UNITED STATES PATENT OFFICE.

OLIVER G. FESSENDEN AND SETH G. FESSENDEN, OF STAMFORD, CONN.

IMPROVEMENT IN TICKET-HOLDERS FOR RAILROAD-CARS, &c.

Specification forming part of Letters Patent No. 77,266, dated April 28, 1868.

*To all whom it may concern:*

Be it known that we, OLIVER G. FESSENDEN and SETH G. FESSENDEN, of Stamford, in the county of Fairfield and State of Connecticut, have jointly invented a new and useful Ticket-Holder; and we do hereby declare that the following is a full, clear, and exact description thereof, reference being had to the annexed drawings, making a part of the specification, in which—

Figure 1 is a front elevation. Fig. 2 is a section through the top of the door or cover. Fig. 3 is a similar view, with a rubber roller for inserting the ticket.

Similar letters of reference indicate corresponding parts in the several figures.

This invention relates to a ticket-holder for the reception of through or way tickets for railroad-cars, or any other car or vehicle, or for any vessel on which it may be used for the purpose for which it is adapted, the holder being so constructed that the tickets cannot be taken therefrom by any person not having the key without the use of violent means.

A ticket-holder is provided for every car-seat or state-room or berth, the ticket-holder being numbered to correspond with the number on the seat or room or berth.

To enable others skilled in the art to make and use our invention, we will proceed to describe it.

A represents the panel or convenient place to which the ticket-holder is attached; B, the door or cover, with front of glass or any other transparent material; C, the hinges, by means of which the door is held to the panel; D, the wires for holding the tickets; E, the rubber roller or metal roller, having a milled head, F, on one end, by means of which it is revolved for the purpose of taking the ticket into the aperture in the top of the holder, said aperture being represented in Fig. 2, and the side opposite said roller being made smooth by any suitable means, so that the ticket can slide easily into its place. Likewise, the roller may be so placed as to work from the back instead of the front of the holder.

G is a staple, firmly fixed to the panel A, in which the bolt of the lock of the door B engages. H is a partition for dividing the ticket-holder into two compartments for the tickets.

The object of this invention is to render it unnecessary for the conductor of a railroad-car or the clerk of a boat to call on the passenger to show his ticket after he has taken his seat, while, at the same time, the seat of the passenger is secured thereby, and to facilitate the work of the conductor in collecting the tickets.

On entering the car the passenger selects any unoccupied seat on the panel of the car of which there is a ticket-holder in which there is no ticket. The holder is composed of two compartments, with distinguishing figures. He inserts his ticket (to which he may or may not attach his name) through the aperture in the top of the holder, and feeds it down by turning the wheel F; or, instead of inserting his ticket, he may wait for the conductor to put it into the holder.

The holder is closed by a lock, of which the conductor has the key, the locks of the holders being similar; and the ticket being once deposited in the holder, there is no way of taking it therefrom, unless by violence, but by application to the conductor. Thus the ticket-holder shows the conductor at all times the place or station to which the passenger is bound, and the conductor can take the ticket when it suits his convenience, or as occasion requires, without disturbing the passenger.

This device is for the convenience, also, of the passenger in looking for a seat. It shows him at a glance, on entering the car, the seats that are vacant and unclaimed. And since a single passenger is entitled to one seat only, and that the seat which he has taken, an entering passenger may take the seat which the ticket-holder shows to be unoccupied. If he is desirous of securing a particular seat, he may deposit his ticket in the holder several hours before the cars leave the depot, if he has purchased his ticket, and thus secure his seat before entering the cars to take possession of it.

Having thus described our invention, what we claim as new and useful is—

1. The ticket-holder made substantially as described, and its equivalents, for the purposes specified.

2. The roller E and its equivalents, for the purposes specified.

OLIVER G. FESSENDEN.
SETH G. FESSENDEN.

Witnesses:
SAMUEL FESSENDEN,
CALVIN G. CHILD,
FRED. W. DOW,
JOS. L. COOMBS.